UNITED STATES PATENT OFFICE.

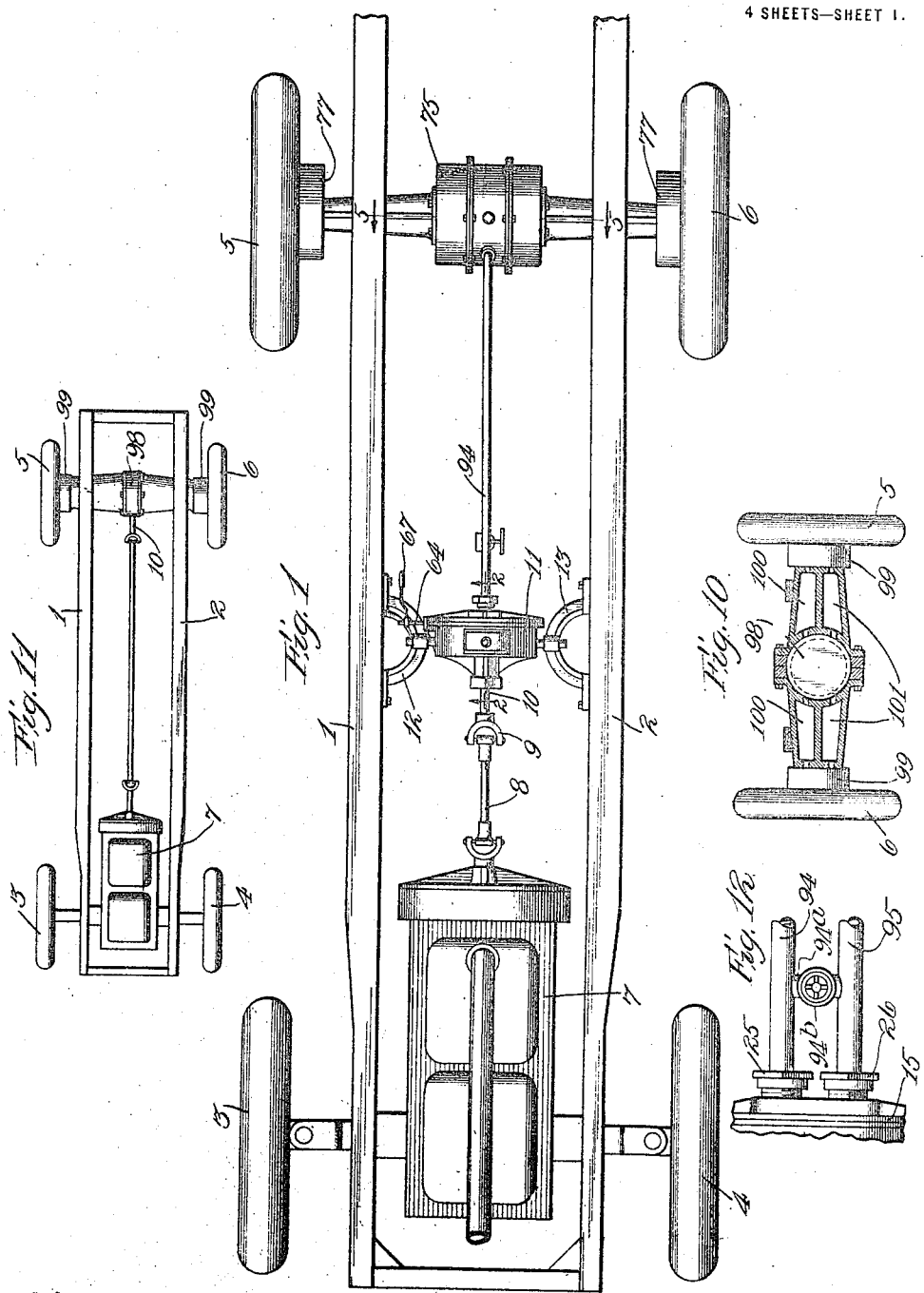

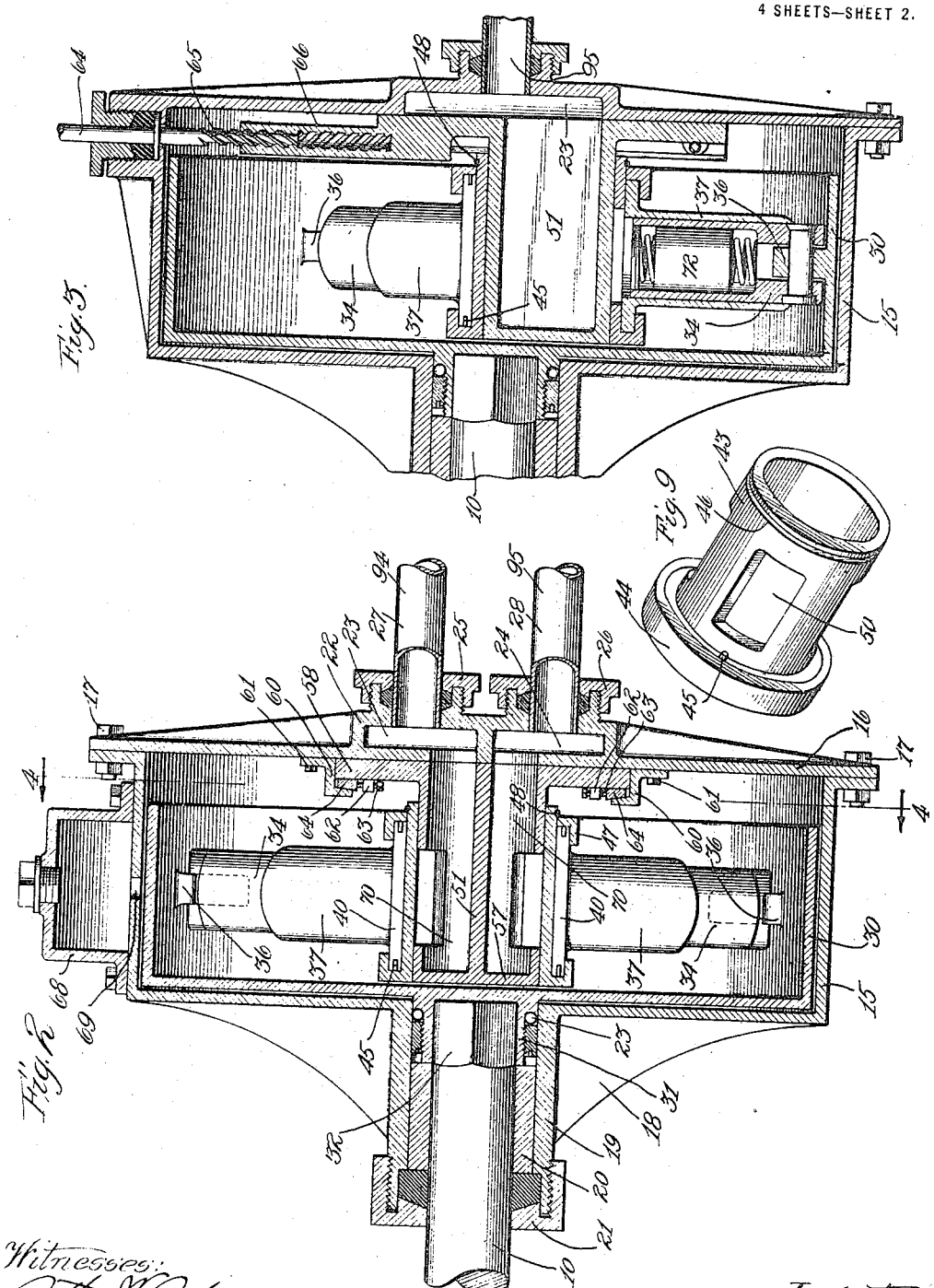

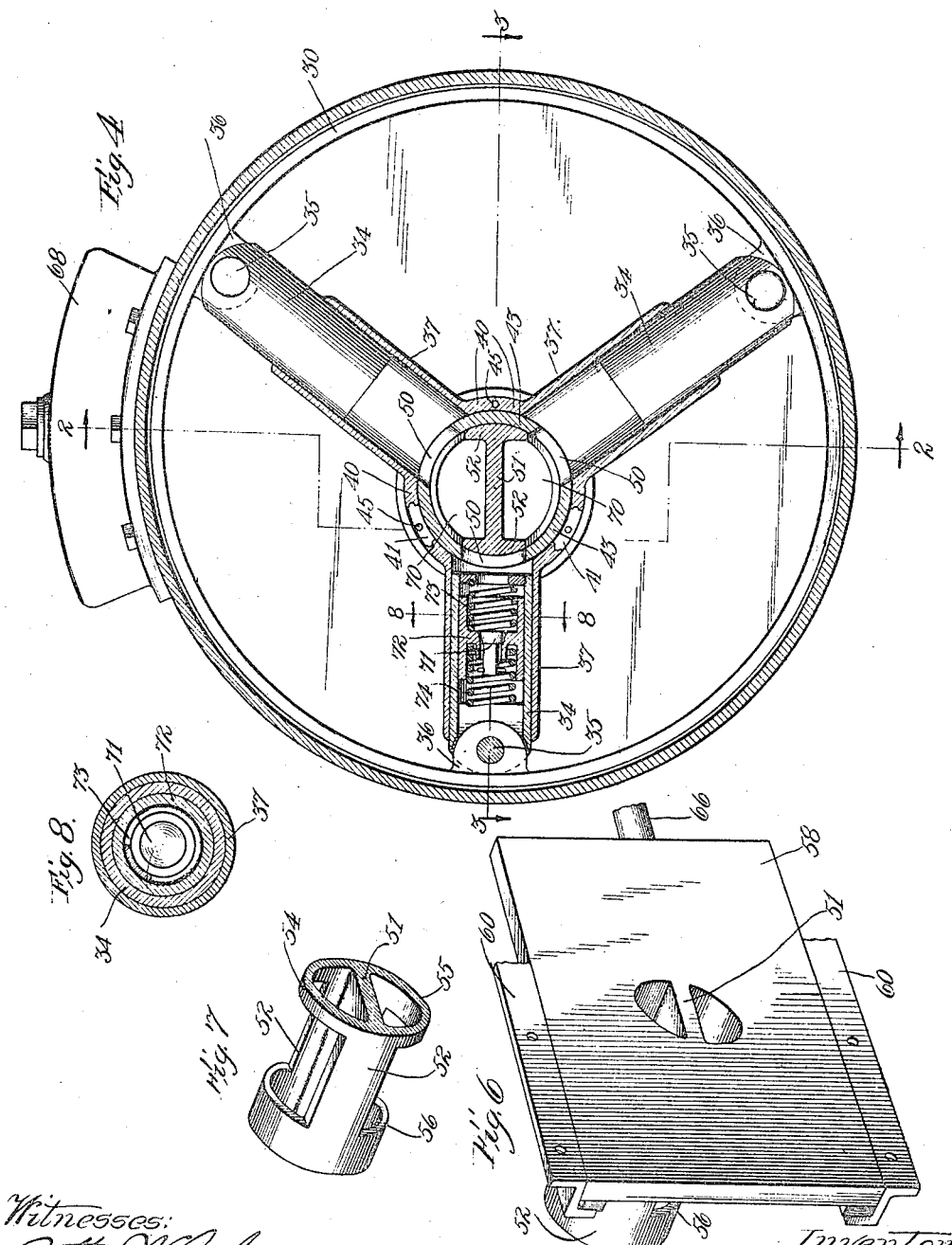

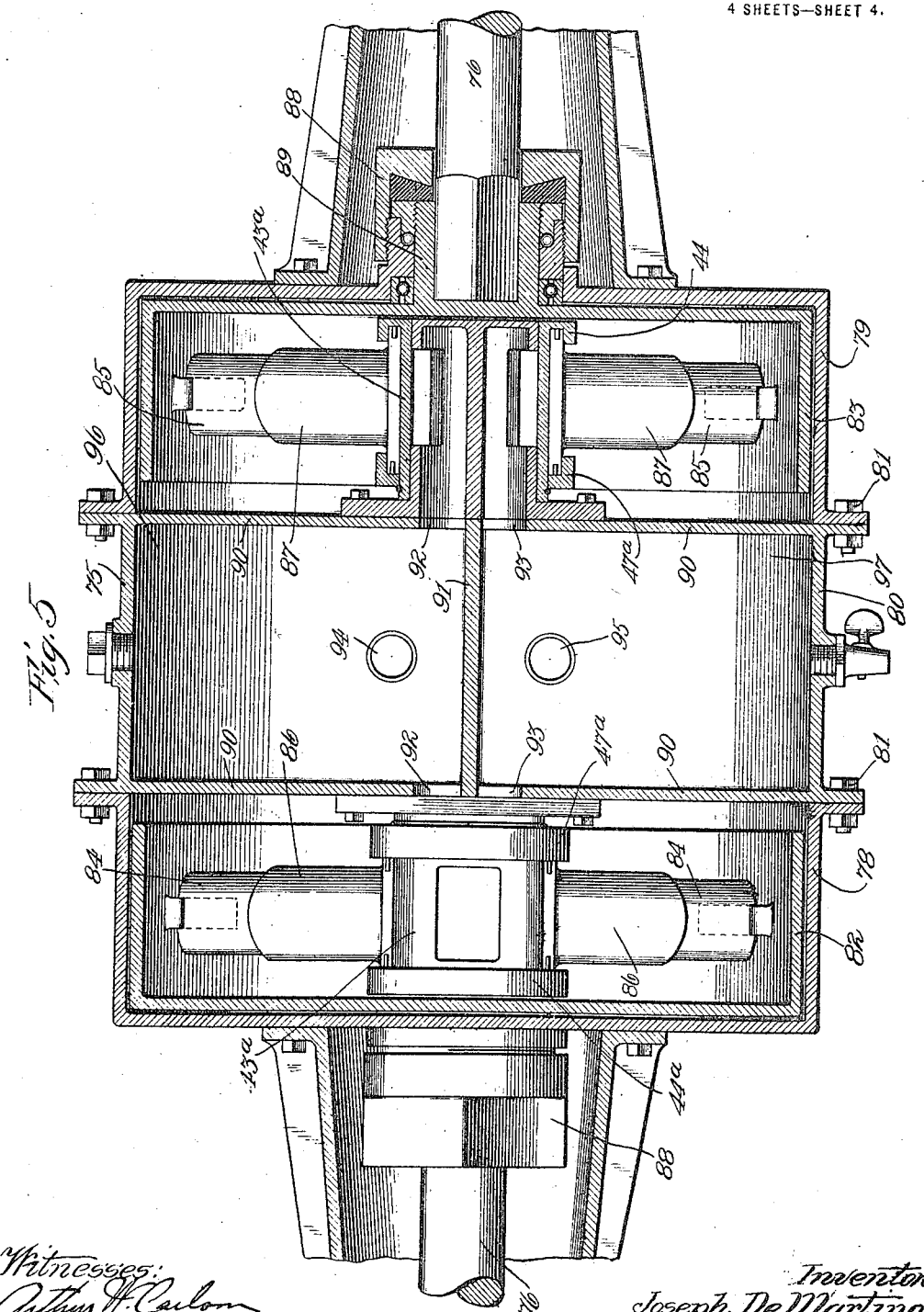

JOSEPH DE MARTINO AND EUGENE MAUREY, OF CHICAGO, ILLINOIS.

HYDRAULIC TRANSMISSION.

1,310,945.  Specification of Letters Patent.  Patented July 22, 1919.

Application filed April 20, 1914. Serial No. 833,081.

*To all whom it may concern:*

Be it known that we, JOSEPH DE MARTINO and EUGENE MAUREY, citizens of the United States, residing at Chicago, in the county of Cook and State of Illinois, have invented a certain new and useful Improvement in Hydraulic Transmissions, of which the following is a full, clear, concise, and exact description, reference being had to the accompanying drawings, forming a part of this specification.

Our invention relates to apparatus for hydraulic transmission of power, and especially to an adaptation thereof for use in motor vehicles.

Prominent objects of the invention are to provide a practical and effective hydraulic transmission apparatus; to increase the efficiency thereof; to provide a construction which shall be particularly well adapted for use in very light motor vehicles, as well as other motor vehicles; to secure simplicity of construction and certainty, effectiveness, and accuracy in operation; and to secure the foregoing and other desirable results in a simple and practical manner.

In the accompanying drawings Figure 1 is a plan view of an automobile equipped with hydraulic transmission apparatus embodying my invention;

Fig. 2 is a vertical section taken on line 2—2 in Fig. 1;

Fig. 3 is a horizontal section taken on line 3—3 in Fig. 4;

Fig. 4 is a vertical section taken on line 4—4 in Fig. 2;

Fig. 5 is a vertical section taken on line 5—5 in Fig. 1;

Figs. 6, 7, 8 and 9 are views of details of construction;

Figs. 10 and 11 are views of modified forms of the apparatus;

Fig. 12 is a fragmentary view of a portion of the device shown in Fig. 1.

Referring first to Fig. 1 I show a motor vehicle for longitudinally extending body frame members 1 and 2, front wheels 3 and 4, and rear wheels 5 and 6. An engine 7 is shown mounted in the front part of the vehicle. This engine may be of any suitable type or design and may be mounted in any preferred way. The main driving shaft 8 of the engine is shown extending rearwardly and connected by a coupling 9 with a supplemental driving shaft 10. This latter shaft communicates the engine power to the hydraulic transmission apparatus, by which latter it is communicated to the vehicle, as for example to the rear wheels, so as to drive the vehicle. One member of the hydraulic transmission apparatus is shown at 11, the same being conveniently mounted between the frame members 1 and 2 upon suitable brackets 12 and 13 secured to the latter. The member 11, which we will call the driving or pumping member, is shown more in detail in Figs. 2, 3 and 4, as well as the detail figures, Figs. 6 to 9 inclusive. This member 11, as shown in said figures, comprises an outer casing 15 in the form of a drum provided with a head 16 bolted to the drum 15 by bolts 17—17. This drum 15 is constructed with a forwardly extending bearing portion 18 forming a sleeve or socket 19 which serves as a bearing for the stuffing box members 20 and 21 for the end of the supplemental crank shaft 10. The plate 16 is constructed with a central enlargement 22 in which are formed oil or liquid chambers 23 and 24. This plate also is constructed with stuffing box members 25 and 26 which hold the ends of pipes 27 and 28, the purpose of which will be more fully explained hereinafter.

Within the casing formed by the drum 15 and head 16 is a rotary member 30 which is also circular or cylindric in form and fits closely within the drum 15. This rotary member 30 has a square socket 31, into which the square end 32 of the rotary driving shaft 10 is fitted (Fig. 2). Ball bearings 33 are desirably provided for the rotation of the member 30. The rotary member 30 carries a plurality of pistons 34—34 which are pivotally connected at 35—35 to lugs 36—36 projecting inwardly from the inner surface of the rim of said member 30. These pistons 34 extend inwardly and fit and work in cylinders 37—37 arranged within the interior of the member 30. A plurality of pistons 34 and cylinders 37 are employed, three being shown in the drawings although the number could be varied. The cylinders 37 are constructed with individual hub portions 40, all three of which make nearly but not quite an entire cylinder, as shown in Fig. 4. In certain positions of the member 30 these hub portions 40 are practically together, as shown by the two right hand members in Fig. 4, but in other positions said members are separated with intervening spaces 41 between, as shown by the left hand member, (Fig. 4). These hub portions 40 are mounted upon a valve sleeve or collar 43 (Fig. 9), so that they are free to move relatively to said collar. The collar 43 is provided with a rim 44 which incloses the end portions or edges of these members 40, as shown in Fig. 2, and pins 45 project from this rim 44 into the spaces between the hub portions 40—40, as shown in Fig. 4. The other end of the collar 43 is provided with an annular groove 46 and a ring or collar 47 is mounted upon the end of the member 43 as shown in Fig. 2, and then a wire or band 48 is put in place in the groove 46 so as to hold said ring 47 in position and thereby hold the members 40 and 43 together. The sleeve 43 is provided with openings 50—50 which in the present instance being a triplex arrangement are three in number. The sleeve 43 is mounted for rotation upon a valve 51 which is in the form of a central web or flange with lateral projecting ends or valve portions 52—52. These valve portions are of substantially the same size as the openings or ports 50 in the sleeve 43 so that said valves 52 may open and close the ports 50. The valve member 51 is formed as a longitudinal partition in a hollow cylindric member 54 (Fig. 7), the valve portions 52 being longitudinally extending cylindric sections formed by cutting away portions of the cylindrical end members or rings 55 and 56. This valve member 51 has one of its ends closed by a web or disk 57 (Fig. 2) and its other end is preferably made integral with a laterally arranged plate 58, (Figs. 2 and 6). This plate 58 is fitted closely against the central portion of the head 16 and the latter is provided with guide-ways 60, by which said plate 58 may be moved back and forth in a horizontal direction, but may not be turned or rotated. The guide-ways 60 are conveniently secured to the head 16 by bolts 61 (Fig. 2), and the plate 58 is provided with lugs 62 which support screws 63 controlling adjustable members 64 by which the plate 58 may be held to the desired degree of tightness without interfering with its motion. A movement of the plate 58 carrying the valve member 51 to one side or the other, referring to Fig. 4, will obviously change the eccentricity of said valve member 51 relatively to the rotary member 30. Such a horizontal shifting motion on the part of plate 58 may be secured by means of a controlling rod 64 (Fig. 3) having its end provided with a steep pitched triple screw 65 adapted to fit into a correspondingly threaded socket 66 preferably formed integral with the plate 58. The rod 64 may be controlled by a handle or lever 67, (Fig. 1). Obviously by shifting the handle 67 the rod 64 will be turned and the plate 58 with its valve member 54 will be shifted horizontally to change the eccentricity of the valve arrangement and the extent of movement is such as to enable the operator to place the valve member 51 in any desired position between full or greatest eccentricity, as shown in Fig. 4, and a position substantially concentric with the rotary member 30.

The entire interior of the rotary member 30 is filled with oil or any other suitable liquid and the cylinders 37 and valve sleeve 43 and all of the communicating passages and ducts are also filled with oil. A supplemental oil supply chamber 68 (Figs. 2 and 4) is mounted upon the top of the drum 15 and connected with the same by a port or opening 69 so that oil may be continually supplied to the working parts.

Thus it will be seen that by the operation of the engine 7 the shafts 8 and 10 are rotated, and the rotation of the shaft 10 causes the rotation of the rotary member 30. When this member rotates as for example, in the direction indicated by the arrow in Fig. 4, the pistons 34 work in and out of the cylinders 37 and cause a circulation of the oil or other liquid within the interior of the mechanism. Considering the movement of the member 30 as indicated in Fig. 4, the uppermost piston 34 is entering this cylinder 37 and consequently forcing the oil or liquid within said cylinder 37 out of the same and through the port 50, and into the upper space or chamber 70. At the same time the lowermost piston 34 is receding from within its cylinder 37 and thereby sucking or withdrawing oil or liquid from the lower chamber 70. The other piston 34, at the left hand side of the figure, has entered its cylinder 37 to a maximum extent and is about to begin moving out of said cylinder. The valves 52 are maintaining the ports 50 for the two right hand cylinders in an open condition, and maintaining the port 50 for the other cylinder in a closed condition. The latter port, however, is about to begin being opened so as to permit withdrawal of liquid from the lower chamber 70 into said cylinder 37. In this condition then the upper chamber 70 is having liquid forced into it and so is a pressure chamber, whereas the lower chamber 70 is having oil or liquid withdrawn from it and so is for the time being an exhaust chamber. This condition remains during the rotation of the member 30. It will be noted that the valve sleeve 43 is rotated with the member 30 and pistons 34 and cylinders 37, due to the hub members 40 engaging one or more of the pins 45.

It will also be noted that each piston 34, as shown in Fig. 4, in connection with the left hand piston, is provided with a check valve 71 set in a movable sleeve 72 controlled by springs 73 and 74. This arrangement permits ample pressure for the purposes of the apparatus to be obtained by the movement of the pistons, but at the same time makes a yielding or elastic arrangement by which breakage is prevented, and gives smooth running.

Having now described the driving element of the apparatus reference will be made to the driven element or elements. Referring to Fig. 1, a driven element 75 is shown arranged in connection with the rear axle and rear wheel. This element is shown more fully in Fig. 5, in which the separate and independent axles of the rear wheels are shown at 76—76, the rear wheels being provided with the usual break drums or rims 77—77. The element 75 comprises two drums or drum members 78 and 79, and a central or intermediate member 80, to which the drums 78 and 79 are secured by bolts 81—81. The drums 78 and 79 are similar to the drum 15 previously described and contain rotary members 82 and 83 equipped with pistons 84 and 85 working in cylinders 86 and 87 similar to the pistons 34 and cylinders 37 previously described. The rear wheel axles 76—76 fit into stuffing boxes 88 and also into sockets 89 formed on the drums 82 and 83. Valve mechanism similar to the valve mechanism previously described is arranged within the rotary members 82 and 83, rims 44ª, rings 47ª, valve sleeves 43ª, and other parts similar to the corresponding parts of the previously described arrangement being shown. The central member 80 is in the form of a cylinder with ends 90—90, and a horizontal dividing web or partition 91. Apertures 92—92 are formed in the ends or walls 90 above the partition 91 and other apertures 93—93 are formed in the walls 90 below the partition 91. Pipes 94 and 95 (Figs. 1, 2 and 5) extend from the driving element 11 to the driven element 75. The pipe 94 communicates with the upper or pressure chamber 70 of the driving element (Fig. 2), through the chamber 23 and said pipe also communicates with the upper chamber 96 of the driven element 75 (Fig. 5). Pipe 95 communicates with the lower or exhaust chamber 70 of the driving element, and also communicates with the lower or exhaust chamber 97 of the driven element. Thus it will be seen that the hydraulic pressure constantly imparted to the liquid by the driving element 11 causes a circulation under pressure from the upper or pressure chamber 70 of said element through the pipe 94 and into the pressure chamber 96 of the driven element, and from said chamber 96 into the interior of the cylinders 86 and 87 of the driven apparatus. Also the exhaust circulation leaves the cylinders 86 and 87 and flows into the exhaust chamber 97 of the driven mechanism, and thence through the pipe 95 into the lower or exhaust chamber 70 of the driving element. This hydraulic circulation under pressure causes a rotation of the members 82 and 83 of the driven apparatus and thereby causes a rotation of the axle 76 and rear wheels 5 and 6. The speed of rotation of said axles and wheels is controlled by the controlling lever 67, (Fig. 1), said lever shifting the position or eccentricity of the valve mechanism of the driving element as previously pointed out. By increasing the eccentricity to its maximum extent the speed will be greatest and by decreasing such eccentricity almost to concentricity the speed will be reduced to a minimum. In order to reverse the direction of motion the valve mechanism of the driving element is shifted to the other side of the driving drum 30; that is to say to the right hand side of said drum, referring to Fig. 4. When this is done the upper chamber 70 becomes the exhaust chamber and the lower chamber 70 becomes the pressure chamber, and consequently the circulation or distribution of the liquid is reversed and the direction of rotation in the driven apparatus will be reversed. In a reversed position the extent of speed may be varied, as in the forward position. A by-pass 94ª with by-pass valve 94ᵇ (Fig. 12) is provided to permit the engine to be stopped and the rear wheels with driven motors to revolve, as for example in going down hill.

In the driven mechanism shown especially in Fig. 5, it will be seen that the two driven devices will tend to rotate at the same speed, since both receive fluid pressure in the same manner from the driving element. However, there is a differential action between said two driven devices, so that when one tends to retard the other tends to accelerate, due to throwing the surplus hydraulic pressure from the retarded device to the other one. This will automatically help the motor vehicle, when the apparatus is applied to a motor vehicle, in turning, because the wheel turning the outer part of the curve will automatically be driven more rapidly than the other.

In Figs. 10 and 11, we show an arrangement in which the driving element or pump is shown at 98 located between the rear driving wheels 5 and 6. This pump or driving element 98 is understood to be the same in construction as the driving element previously described or any other desired type or driving element. Hydraulic motors 99 are located adjacent to the wheels 5 and 6. These motors may be like the motors previously described herein, or any other desired type or form of motor. Between the pump 98 and motors 99 are ducts or passage-ways 100 and 101, the ducts 100 being pressure ducts as the pump is arranged, and the ducts 101 being return or exhaust ducts. It will be seen that this arrangement is more compact and simple in some respects, the shaft of the prime mover running directly to the rear axle and connecting with the pump without any break or intermediate mechanism.

It will be understood that changes and modifications may be made without departing from the spirit of the invention.

What we claim is:

1. The combination of an outer inclosing casing, a rotary member arranged therein, said casing having a bearing and said member having a hub portion mounted within said bearing, pistons and cylinders arranged within said member and arranged in a substantially radial manner, the outer ends of said pistons being pivotally connected with said rotary member and the inner ends of said cylinders being connected together, valve mechanism for controlling the inlet and outlet of fluid to and from the inner ends of said cylinders, said valve mechanism being mounted upon said casing, and shiftable relatively to same.

2. The combination of an outer inclosing casing, a rotary member arranged therein, said casing having a bearing and said member having a hub portion mounted within said bearing, pistons and cylinders arranged within said member and arranged in a substantially radial manner, the outer ends of said pistons being pivotally connected with said rotary member and the inner ends of said cylinders being connected together, valve mechanism for controlling the inlet and outlet of fluid to and from the inner ends of said cylinders, said valve mechanism being mounted upon said casing, and shiftable relatively thereto, and actuating mechanism extending through the wall of said casing and adapted for shifting said valve mechanism.

3. The combination of a closed cylindric casing constructed to be filled with oil, a rotary member arranged therein and mounted for rotation concentrically of said casing, a bearing for said rotary member on one side wall of said casing, pistons and cylinders carried by said rotary member, and valve mechanism mounted upon the other side wall of said casing, and projecting into the interior of said casing, said valve mechanism comprising a tubular member having a longitudinally extending web dividing it into two longitudinal chambers, and also having apertures by which the cylinders may communicate with said two chambers, and the side wall on which said valve mechanism is mounted being provided with two chambers with elongated openings arranged to communicate with said two chambers of said tubular member, said tubular member being shiftable relatively to said side wall and longitudinally of said elongated apertures.

4. A hydraulic transmission element comprising a rotary drum shaped member, a plurality of pistons pivotally connected with the rim of said member, cylinders for said pistons, said cylinders being located centrally of said rotary member and having their outer ends open to receive said pistons and having their inner ends connected together and mounted in a manner to permit shifting movement eccentrically of said drum, valve mechanism for said pistons and cylinders, and a closed cylindric casing constructed to be filled with oil, said casing being of substantially the same size as said rotary drum shaped member, whereby the latter fits closely within said casing, said eccentricity varying means being carried by one of the walls of said casing.

5. The combination of a rotary drum having an annular rim, pistons pivotally connected with the inside of said rim, cylinders for said pistons, said cylinders having cylindric hub portions, a sleeve having port apertures upon which said cylinder hub portions are fitted and also having means whereby it is engaged and driven by said cylinders, said apertures serving as ports for the inner ends of said cylinders, a valve member comprising a web and valve portions adapted to control said ports, said valve member being inclosed in said sleeve and forming pressure and exhaust chambers on opposite sides of said web.

6. The combination of a rotary drum havign an annular rim, pistons pivotally connected with the inside of said rim, cylinders for said pistons, said cylinders having cylindric hub portions, a sleeve having port apertures upon which said cylinder hub portions are fitted and also having means whereby it is engaged and driven by said cylinders, said apertures serving as ports for the inner ends of said cylinders, a valve member comprising a web and valve portions adapted to control said ports, said valve member being inclosed in said sleeve and forming pressure and exhaust chambers on opposite sides of said web, said valve member being mounted for movement to vary its eccentricity with reference to said rotary drum.

7. The combination of a rotary drum having an annular rim, pistons pivotally connected with the inside of said rim, cylinders for said pistons, said cylinders having cylindric hub portions, a sleeve having port apertures upon which said cylinder hub portions are fitted and also having means whereby it is engaged and driven by said cylinders, said apertures serving as ports for the inner ends of said cylinders, a valve member comprising a web and valve portions adapted to control said ports, said valve member being inclosed in said sleeve and forming pressure and exhaust chambers on opposite sides of said web, said valve member being mounted for movement to vary its eccentricity with reference to said rotary drum, and means for moving said valve member.

8. The combination of a rotary drum having an annular rim, a series of pistons pivotally connected with the interior of said rim, cylinders for said pistons, a valve sleeve to which the inner ends of said cylinders are connected, said cylinder ends being movable circumferentially relative to said sleeve, said sleeve having an overlapping rim extending over the end portion of said cylinder ends and being provided with pins adapted to engage said cylinder ends, said sleeve being provided with apertures serving as ports for the inner ends of said cylinders, a valve member arranged within said sleeve and comprising a web portion dividing the sleeve into separate chambers, and valve portions adapted to open and close the ports in said sleeve, and a ring arranged upon the other end of said sleeve and engaging the other edges of said cylinder ends.

9. The combination of a rotary drum having an annular rim, a series of pistons pivotally connected with the interior of said rim, cylinders for said pistons, a valve sleeve to which the inner ends of said cylinders are connected, said cylinder ends being movable circumferentially relative to said sleeve, said sleeve having an overlapping rim extending over the end portion of said cylinder ends and being provided with pins adapted to engage said cylinder ends, said sleeve being provided with apertures serving as ports for the inner ends of said cylinders, a valve member arranged within said sleeve and comprising a web portion dividing the sleeve into separate chambers, and valve portions adapted to open and close the ports in said sleeve, and a ring arranged upon the other end of said sleeve and engaging the other edges of said cylinder ends, a plate carrying said valve member and mounted for sliding non-rotary movement, and a threaded rod engaging a threaded socket in said plate, said rod having a handle and arranged when turned to shift said plate.

10. The combination of a cylindric casing provided with two transverse partitions dividing it into three chambers, the central chamber being provided with a partition dividing it into two semi-circular chambers, the transverse partitions being provided with apertures forming openings to both of said semi-circular chambers, a pair of rotary members, one mounted in each of the end chambers, pistons and cylinders carried by said rotary members, said pistons being arranged radially and pivoted at their outer ends to said members and said cylinders being connected together at their inner ends, valve mechanisms mounted on said transverse partitions, said valve mechanisms having chambers communicating with the chambers between said transverse partitions, and driving connections connecting with said rotary members and extended outwardly from the same and through the end walls of said cylindric casing.

11. The combination of a pair of hydraulic motive elements, each comprising an outer casing, and a rotary pumping mechanism involving pistons and cylinders, said pistons being pivotally mounted at their outer ends and said cylinders having their inner ends connected with one another, and a centrally arranged valve mechanism connecting and controlling the inner ends of said cylinders, a casing intermediate said motive element casings and having a partition dividing it into two chambers, and also having apertures in its walls communicating with the valve mechanism of said motive elements and pipe connections with said chambers of said intermediate casing.

12. The combination of a cylindric casing provided with two end chambers and an intermediate chamber, rotary members in the two end chambers, said members being provided with pistons and cylinders, said pistons being radially arranged and pivotally mounted at their outer ends and said cylinders being connected with one another at their inner ends, a valve mechanism provided with apertures opening into the intermediate chamber, said chamber being divided into two parts and said valve mechanism having apertures opening respectively into each of said parts, and also having inlet and outlet openings into the cylinders.

13. The combination of a closed cylindric casing having two end chambers and an intermediate chamber divided into two parts comprising inlet and outlet parts, rotary members arranged in said end chambers and provided with driving connections, motor devices carried by said rotary members and involving radially arranged pistons and cylinders whereof the pistons are pivotally connected at their outer ends to said rotary members, and valve mechanisms for said motor devices, said valve mechanisms communicating with the inlet and outlet parts of said intermediate chamber.

14. The combination with a rotary pumping device having a radially arranged pumping cylinder and piston therefor, of a slidable member arranged in said piston, springs on opposite sides of said member, and a check valve in said member.

In witness whereof, we hereunto subscribe our names this 10th day of April, A. D., 1914.

JOSEPH DE MARTINO.
EUGENE MAUREY.

Witnesses:
A. MILLER BELFIELD,
A. LYDA JONES.